United States Patent
Wiedenhoefer

(10) Patent No.: US 12,129,796 B1
(45) Date of Patent: Oct. 29, 2024

(54) VORTEX RESTART STRUCTURES FOR TURBULATED PASSAGES

(71) Applicant: Raytheon Technologies Corporation, Farmington, CT (US)

(72) Inventor: James Fredric Wiedenhoefer, Windsor, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/138,366

(22) Filed: Apr. 24, 2023

(51) Int. Cl.
*F02C 7/057* (2006.01)
*F01D 25/08* (2006.01)

(52) U.S. Cl.
CPC .............. *F02C 7/057* (2013.01); *F01D 25/08* (2013.01); *F05D 2240/127* (2013.01)

(58) Field of Classification Search
CPC ..... F02C 7/057; F01D 25/08; F05D 2240/127
See application file for complete search history.

(56) References Cited

U.S. PATENT DOCUMENTS

| | | | |
|---|---|---|---|
| 7,824,156 | B2 | 11/2010 | Dellmann et al. |
| 10,364,684 | B2 * | 7/2019 | Allen .................. F01D 5/188 |

FOREIGN PATENT DOCUMENTS

| | | | |
|---|---|---|---|
| DE | 3739619 | A1 | 4/1988 |
| DE | 10127084 | A1 | 3/2002 |
| DE | 202004013882 | U1 | 1/2006 |
| DE | 202004020294 | U1 | 5/2006 |
| EP | 2397457 | A2 | 12/2011 |
| WO | 2010110833 | A2 | 9/2010 |

OTHER PUBLICATIONS

Extended European Search Report for counterpart EP application No. 24159298.9 dated Aug. 28, 2024.

* cited by examiner

*Primary Examiner* — Jacob M Amick
*Assistant Examiner* — Charles J Brauch
(74) *Attorney, Agent, or Firm* — Bachman & LaPointe, P.C.

(57) ABSTRACT

A vortex restart structure including a flow passage having a first wall and a second wall opposite the first wall, each of the first wall and the second wall including a parting surface; multiple flow turbulators extending from at least one parting surface of the first wall or the second wall; and at least one vortex restart structure extending from at least one parting surface of the first wall or the second wall, wherein the at least one vortex restart structure extends from the parting surface into the flow passage beyond the multiple flow turbulators.

19 Claims, 3 Drawing Sheets

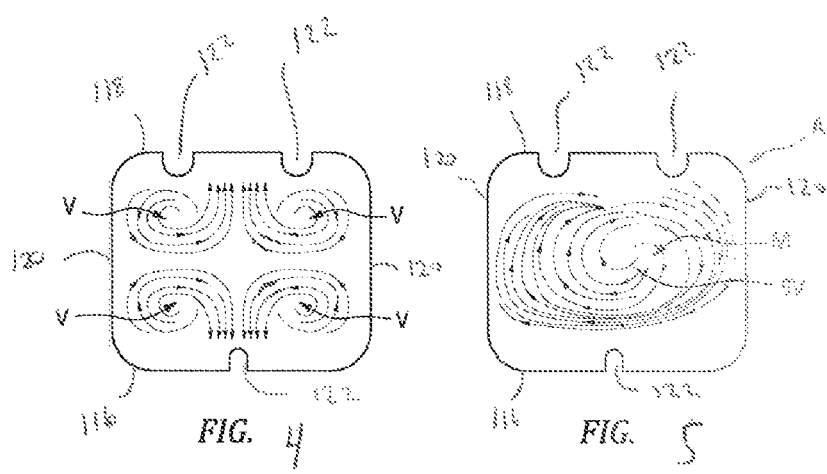

VORTEX RESTART STRUCTURES FOR TURBULATED PASSAGES

This invention was made with Government support under contract N00014-21-C-1067 awarded by the United States Navy. The government has certain rights in this invention.

BACKGROUND

The present disclosure is directed to improved turbulated passages, particularly a vortex restart structure for restarting vortex flow in passages with turbulators.

Heat exchangers, of various varieties, may be found on turbine engines. Some are used to reduce oil temperature while others may be used to heat a fluid. One particular use may be the processing of cooling air, used to cool the high-pressure vanes and blades.

Cooling air for turbine blades and vanes is extracted from the compressor and transported to the turbine. In modern, high pressure ratio engines, it is sometimes necessary to further reduce the temperature of the cooling fluid. The type of heat exchanger employed for the task is engine dependent. Typically, because of the high temperatures and pressures of the cooling fluid, it is necessary to employ the used of a high strength heat exchanger. A cast heat exchanger is a good example.

In a cast heat exchanger, Fluid A may be the turbine cooling air (TCA), while Fluid B may be air from the annular bypass duct. In this example, thermal energy is extracted from Fluid A, via convection, conducted through the parting surface of the heat exchanger and transferred to Fluid B, also via convection. The rate at which the process occurs, as well as any associated drop in pressure of either Fluid A or Fluid B, are dependent on the heat transfer augmentation method. In cast heat exchangers, it is common for the passages to contain chevron style turbulators. These turbulators, affixed to both the upper and lower surfaces of a passage, serve to generate large scale mixing features. In particular, for the case of chevrons, a set of counter-rotating vortex pairs V is produced as seen in FIG. 4.

The counter-rotating vortecies V move the spent fluid, near the wall, and mix it with the largely unspent fluid in the center of the passage. Additionally, the vortecies V transport this newly mixed, bulk fluid down to the surface in such a way as to enhance the convection heat transfer coefficient. The performance of such a turbulated passage is dependent on the temperature difference between the bulk fluid and the wall temperature.

A simple equation to describe the performance of convection heat transfer is $Q=HA(T_{fluid}-T_{wall})$. Here, the total energy transfer, Q, is dependent on the convection heat transfer coefficient, H, the wetted area, A, and the temperature difference between the fluid and the wall. Note, that the energy transfer, Q may be either positive or negative, depending on whether the passage fluid is to be heated or cooled.

In the case of cast heat exchangers, the set of counter-rotating vortex pairs may break down and merge together. This phenomenon has been observed most regularly when the passage is asymmetric A. As seen in FIG. 5, when the vortecies merge M, they produce a single, larger vortex SV which transports the spend fluid around the passage without mixing it with the central, bulk flow. As a result, the temperature of the spent fluid approaches the wall temperature. The reduced temperature difference results in a significant reduction in overall heat transfer, Q.

Despite the existence of turbulated passageways, there remains a need for surfaces to employ techniques to prevent the break down of the counter rotating vortex pair.

SUMMARY

In accordance with the present disclosure, there is provided a vortex restart structure for a heat exchanger for a gas turbine engine comprising a second surface bounding a gas path of the gas turbine engine; a flow passage configured to deliver airflow therethrough, including: a first surface located opposite the second surface, the first surface and the second surface together defining a parting surface; a plurality of flow turbulators located along the first surface, each flow turbulator having a flow turbulator height e extending from the first surface; and the at least one vortex restart structure located along the first surface, each of at least one vortex restart structure extending from the first surface, wherein the at least one vortex restart structure is longer than the plurality of flow turbulators.

A further embodiment of any of the foregoing embodiments may additionally and/or alternatively include the flow passage includes a height H; wherein the at least one vortex restart structure extends from the first surface into the flow passage a height R; wherein $0.01 \le e/H \le R/H < 0.5$.

A further embodiment of any of the foregoing embodiments may additionally and/or alternatively include the plurality of flow turbulators have a pitch P; wherein the at least one vortex restart structure can be spaced apart a distance of from about 1× to about 10× the flow turbulator pitch P.

A further embodiment of any of the foregoing embodiments may additionally and/or alternatively include a first vortex restart structure can extend from the first surface and align axially with a second vortex restart structure extending from the second surface.

A further embodiment of any of the foregoing embodiments may additionally and/or alternatively include the parting surfaces forming the flow passage include a cross-sectional asymmetry susceptible to a vortex breakdown.

In accordance with the present disclosure, there is provided a vortex restart structure comprising a flow passage having a first wall and a second wall opposite the first wall, each of the first wall and the second wall including a parting surface; multiple flow turbulators extending from at least one parting surface of the first wall or the second wall; and at least one vortex restart structure extending from at least one parting surface of the first wall or the second wall, wherein the at least one vortex restart structure extends from the parting surface into the flow passage beyond the multiple flow turbulators.

A further embodiment of any of the foregoing embodiments may additionally and/or alternatively include the multiple flow turbulators are formed in each of the first wall and the second wall; and the at least one vortex restart structure is formed in each of the first wall and the second wall.

A further embodiment of any of the foregoing embodiments may additionally and/or alternatively include the multiple flow turbulators extend a distance e from the first wall and second wall respectively; wherein the flow passage includes a height H; wherein the at least one vortex restart structure extends from at least one of the first wall and the second wall into the flow passage a height R; wherein $0.01 \le e/H \le R/H < 0.5$.

A further embodiment of any of the foregoing embodiments may additionally and/or alternatively include the flow passage is thermally coupled to a fluid A in communication with the parting surface of the flow passage; the parting surface configured to thermally couple fluid A and a fluid B flowing in the flow passage for the transfer of thermal energy between the fluid A and the fluid B flowing in the flow passage responsive to a formation of counter rotating vortex pairs in the fluid B being restarted.

A further embodiment of any of the foregoing embodiments may additionally and/or alternatively include the multiple flow turbulators have a pitch P; wherein the at least one vortex restart structure configured spaced apart from about 1× to about 10× the flow turbulator pitch P.

A further embodiment of any of the foregoing embodiments may additionally and/or alternatively include a first vortex restart structure can extend from the first wall and align axially with a second vortex restart structure extending from the second wall.

A further embodiment of any of the foregoing embodiments may additionally and/or alternatively include the flow passage is formed in a gas turbine heat exchanger.

In accordance with the present disclosure, there is provided a process for managing a merged vortex with a vortex restart structure for a gas turbine engine heat exchanger comprising forming a flow passage having a first wall and a second wall opposite the first wall, each of the first wall and the second wall including a parting surface; extending multiple flow turbulators from the parting surface of the first wall or the second wall; and extending at least one vortex restart structure from the parting surface of the first wall or the second wall, wherein the at least one vortex restart structure extends from the parting surface into the flow passage beyond the multiple flow turbulators.

A further embodiment of any of the foregoing embodiments may additionally and/or alternatively include the flow passage includes a height H; extending the at least one vortex restart structure from the first surface into the flow passage a height R; wherein $0.01 \leq e/H \leq R/H < 0.5$.

A further embodiment of any of the foregoing embodiments may additionally and/or alternatively include the plurality of flow turbulators have a pitch P; and spacing the at least one vortex restart structure apart a distance of from about 1× to about 10× the flow turbulator pitch P.

A further embodiment of any of the foregoing embodiments may additionally and/or alternatively include the process further comprising extending a first vortex restart structure from the first wall; extending a second vortex restart structure from the second wall opposite the first vortex restart structure; and aligning the first vortex restart structure axially with the second vortex restart structure.

A further embodiment of any of the foregoing embodiments may additionally and/or alternatively include the process further comprising forming the parting surfaces the flow passage including a cross-sectional asymmetry susceptible to a vortex breakdown.

A further embodiment of any of the foregoing embodiments may additionally and/or alternatively include the process further comprising creating a physical barrier with the at least one vortex restart structure within the flow passage; and causing a merged vortex flowing in the flow passage to break up.

A further embodiment of any of the foregoing embodiments may additionally and/or alternatively include the process further comprising reforming a counter rotating vortex pair within a vortex restart structure zone downstream of the at least one vortex restart structure within the flow passage by use of a downstream turbulator configured to reassert influence on a flowing fluid within the flow passage.

Other details of the vortex restart structure are set forth in the following detailed description and the accompanying drawings wherein like reference numerals depict like elements.

BRIEF DESCRIPTION OF THE DRAWINGS

FIG. 4 is a partial isometric view schematic representation of an exemplary flow passage with chevron turbulators creating counter rotating vortices.

FIG. 5 is a cross sectional schematic representation of exemplary flow passages with chevron turbulators influencing flow vortex breakdown.

DETAILED DESCRIPTION

Figure 1:
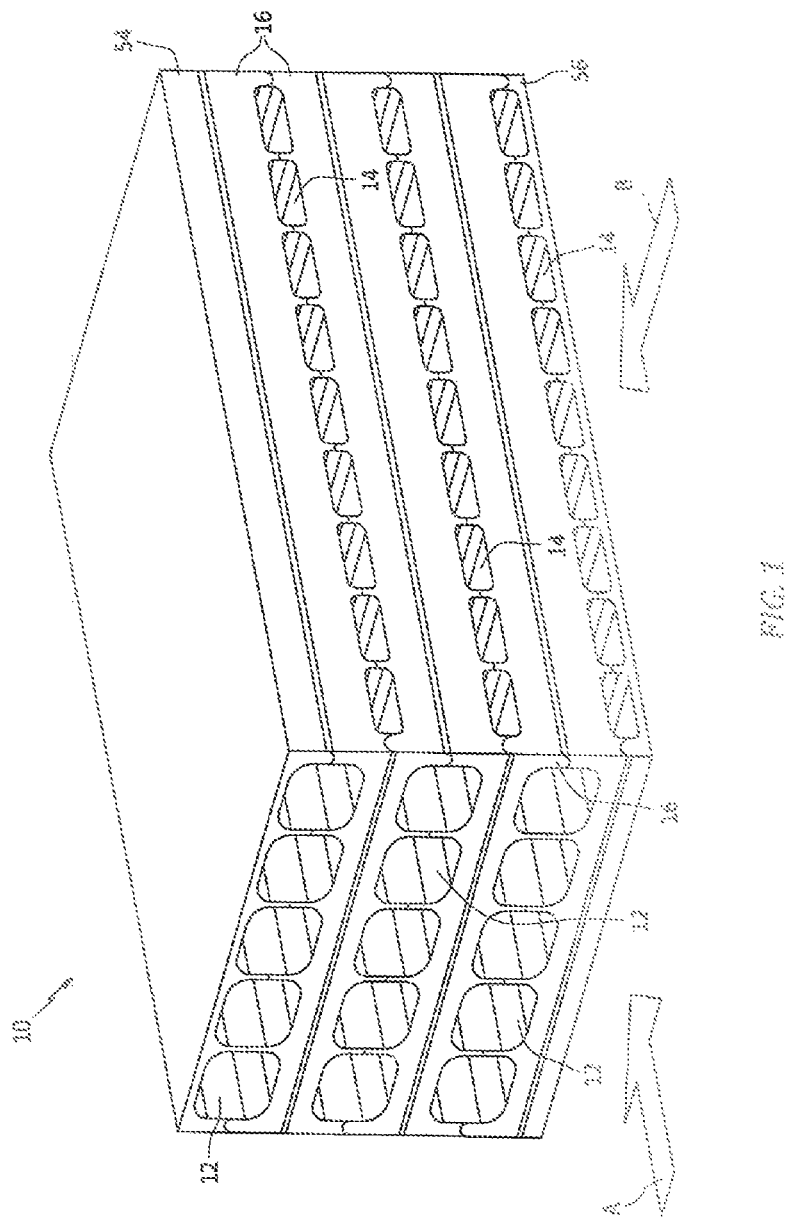
FIG. 1 is a schematic view of a heat exchanger.

FIG. 1 illustrates a cast heat exchanger 10 according to one non-limiting configuration of this disclosure.

Heat exchanger 10 has a plurality of flow passages 12 defining one flow direction A for a first heat exchange fluid A, and a second plurality of flow passages 14 defining a second flow direction B for a second heat exchange fluid B. Flow passages 12, 14 are defined by flow passage segments on opposite sides of a plurality of stacked heat exchanger plates 16. In alternative embodiments the cast heat exchanger 10 can be constructed as a set of cast plates which are then bonded together via brazing or diffusion bonding or welding.

In a cast heat exchanger, Fluid A may be the turbine cooling air (TCA), while Fluid B may be air from the annular bypass duct. In this example, thermal energy is extracted from Fluid A, via convection, conducted through the parting surface of the heat exchanger and transferred to Fluid B, also via convection.

Figure 2:
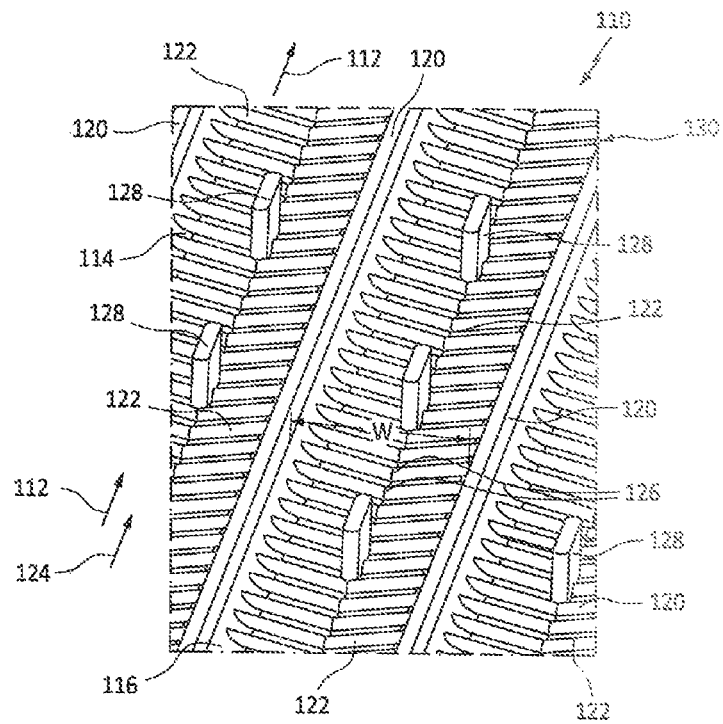
FIG. 2 is a partial isometric view schematic representation of an exemplary splash rib in a flow passage with chevron turbulators.
Figure 3:
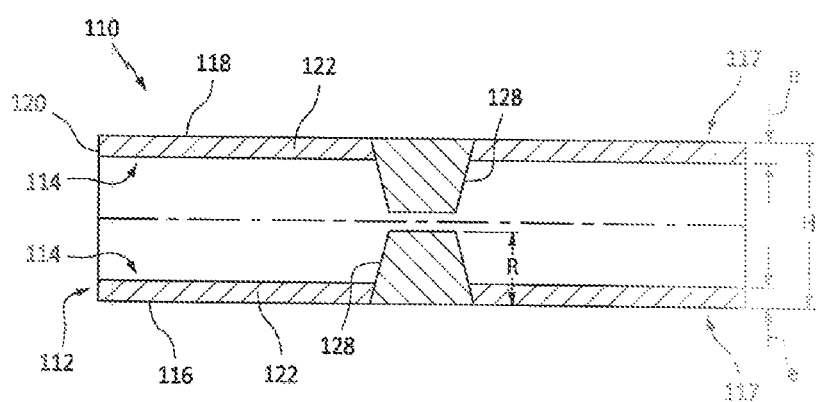
FIG. 3 is a cross sectional schematic representation of exemplary splash ribs in a flow passage with chevron turbulators.

Referring now to FIG. 2 and FIG. 3, there is illustrated a flow passage 110 formed in the cast heat exchanger 10 for flowing fluid 112. The flow passage 110 can include parting surfaces 114 formed on passage walls 117. The parting surface 114 can thermally couple Fluid A and Fluid B for the transfer of thermal energy. The parting surface 114, or parting plate is the thin piece of material separating the two fluids A, B and conducts thermal energy between them.

The flow passage 110 can be bounded by a wall 117 that can include a first wall 116 opposite a second wall 118. The flow passage 110 includes passage separation walls 120 apart from each other. As described above the cross-sectional geometry of the flow passage 110 can be asymmetrically aligned. The cross-sectional asymmetry may lead to the vortex breakdown. The asymmetry of the parting surfaces 114 can influence counter rotating vortex pairs in the fluid, A, B flowing through the flow passage 110.

Multiple flow turbulators 122 can be formed in each of the first wall 116 and the second wall 118. The flow turbulators 122 extend a distance e from the first wall 116 and second wall 118 respectively. The flow turbulators 122 can form a corrugated pattern. In an exemplary embodiment, the flow turbulators 122 can be formed as chevron style turbulators.

The turbulator pattern can take many forms such as chevron, discrete-V, W, discrete-W, and skewed.

Each flow turbulator 122 has a height (e), extending from the parting surface 114 and a passage width, (W), extending along the parting surface 114. Further, adjacent flow turbulators 122 are separated by (spacing) a pitch, (P), along the stream-wise flow direction 124. The pitch, (P), is measured between centers 126 of the adjacent flow turbulator 122. In an exemplary embodiment the turbulator spacings, or Pitch, P, are a function of turbulator height, e. A range can be $5<=P/e<=10$. A low P/e is more aggressive and can result in higher heat transfer coefficient but also higher pressure losses. In some embodiments, the flow passage 110 may have a cross-section aspect ratio (AR) of $1 \leq W/H \leq 4$. This affects the primary rib spacing. Small W/H results in many ribs, which is good for structural strength but adds weight. Large W/H spreads out the ribs, saving weight. The structure of the passage vortex is strongly influenced by this AR value. For chevrons, $2<=AR<=3$ is good. For AR 3-4, typically discrete-W turbulators may be used, which have a more complex vortex pattern. Each flow turbulator 122 can have an e/H of about 0.01 to about 0.3. A low e/H is a less aggressive turbulator, with a low heat transfer coefficient but low pressure loss. A high e/H is just the opposite with a high heat transfer coefficient but high pressure loss.

As seen in FIG. 4, the turbulator 122 produces a pair of counter rotating vortices V which mix the spent, near wall gas with bulk, or central fluid. The mixing results in a higher temperature differential between the fluid 112 and walls 116, 118, producing high heat transfer. However, counter rotating vortex pairs V, found in chevron based, turbulated passages may break down under certain flow passage geometry causing the corner vortices to merge M, resulting the single vortex SV and in reduced heat transfer with little gas mixing near the walls, as seen in FIG. 5.

Referring back to FIG. 3, at least one vortex restart structure or splash rib 128 is formed in the flow passage 110. The splash rib 128 extends into the flow path of passage 110 from at least one of the first wall 116, and the second wall 118 into the flow passage 110, a height R. The splash rib 128 can have a height $0.01 \leq e/H \leq R/H < 0.5$. In an exemplary embodiment the splash rib 128 height and other dimensions may be tailored to a particular flow passage 110 based on the fluid 112 conditions and flow passage 110 geometry.

The splash rib 128 does not extend to the centerline CL but instead can extend short of the centerline CL to avoid contacting the adjacent splash rib 128, thus avoiding any structural response. This prevents transmission of structural loads between adjacent splash ribs 128. The splash rib 128 can have a length (along flow direction 124) of 2X the flow turbulator pitch P.

In an exemplary embodiment, the splash rib 128 can be spaced apart from about 1× to about 3× the flow turbulator pitch P. The axial length of the splash rib 128 can be configured to influence the bulk flow. A multiple of the turbulator pitch is convenient because it allows for easy blending with the turbulator structures 122. The splash rib 128 can overlap with the flow turbulator 122, to avoid any stress risers. The splash rib 128 can be spaced apart at the most every 10 flow turbulators 122. The splash rib 128 can be spaced apart at other distances closer or further, depending on needs of the design and the flow conditions in the flow passage 110. The splash rib 128 extending from the first wall 116 can align axially with the splash rib 128 extending from the second wall 118.

The splash rib 128 can be a short, partial height rib structure which creates a physical barrier into which the undesirable, merged vortex can "splash" into causing the merged vortex to break up. Within a splash rib zone 130, the local flow turbulators 122 can reassert influence on the flowing cooling fluid 112 to reform a counter rotating vortex pair.

In terms of a design of the flow passage 110 or the flow turbulators 122 or the splash rib 128, a particular flow passage 110 configuration (inclusive of a particular flow turbulator/splash rib configuration) that is used may be based on one or more tests, simulations, computational fluid dynamics (CFD) analyses, and the like.

The heat exchanger may be used for internal engine cooling purposes (e.g., cooling a compressed bleed flow bled from the compressor and directing it to cool the turbine). Alternative cooling involves similarly drawing bleed air but directing it to elsewhere in the aircraft. A single heat exchanger may serve both purposes (with outlet flow split) or there may be multiple such heat exchangers each with a dedicated purpose. Yet another purpose involves non-bleed flows. For example, there may be in-aircraft cooling requirements wherein a flow from the aircraft fuselage is passed to the heat exchanger inlet and returned via the outlet (e.g., a closed-loop system).

Various components of this disclosure may be composed of one or more materials. For example, one or more metals (e.g., nickel, steel, aluminum, titanium, etc.) may be used in a manufacture of the heat exchanger.

One or more techniques may be utilized to manufacture a heat exchanger of this disclosure. For example, casting, machining, an application of one or more chemicals (e.g., chemical etching), additive manufacturing, etc., may be used.

It is contemplated that the flow passage can also be formed as part of other gas turbine components, such as vanes, blades and blade outer air seals.

A technical advantage of the disclosed vortex restart structure includes a 10% higher integrated heat flux by employing the splash ribs as compared to not employing the splash ribs.

Another technical advantage of the disclosed vortex restart structure includes merely a slight increase in overall pressure loss by utilizing the splash ribs.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

There has been provided a vortex restart structure. While the vortex restart structure has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A vortex restart structure for a heat exchanger for a gas turbine engine comprising:
   a second surface bounding a gas path of the gas turbine engine;
   a flow passage configured to deliver airflow therethrough, including:
   a first surface located opposite the second surface, the first surface and the second surface together defining a parting surface;

a plurality of flow turbulators located along the first surface, each flow turbulator having a flow turbulator height e extending from the first surface; and the at least one vortex restart structure located along the first surface, each of at least one vortex restart structure extending from the first surface, wherein the at least one vortex restart structure is longer than the plurality of flow turbulators.

2. The vortex restart structure according to claim 1, wherein the flow passage includes a height H; wherein the at least one vortex restart structure extends from the first surface into the flow passage a height R; wherein $0.01 \leq e/H \leq R/H < 0.5$.

3. The vortex restart structure according to claim 1, wherein the plurality of flow turbulators have a pitch P; wherein the at least one vortex restart structure can be spaced apart a distance of from about 1× to about 10× the flow turbulator pitch P.

4. The vortex restart structure according to claim 1, wherein a first vortex restart structure can extend from the first surface and align axially with a second vortex restart structure extending from the second surface.

5. The vortex restart structure according to claim 1, wherein the parting surfaces forming the flow passage include a cross-sectional asymmetry susceptible to a vortex breakdown.

6. A vortex restart structure comprising:
a flow passage having a first wall and a second wall opposite the first wall, each of the first wall and the second wall including a parting surface;
multiple flow turbulators extending from at least one parting surface of the first wall or the second wall; and
at least one vortex restart structure extending from at least one parting surface of the first wall or the second wall, wherein the at least one vortex restart structure extends from the parting surface into the flow passage beyond the multiple flow turbulators.

7. The vortex restart structure according to claim 6, wherein the multiple flow turbulators are formed in each of the first wall and the second wall; and the at least one vortex restart structure is formed in each of the first wall and the second wall.

8. The vortex restart structure according to claim 7, wherein the multiple flow turbulators extend a distance e from the first wall and second wall respectively; wherein the flow passage includes a height H; wherein the at least one vortex restart structure extends from at least one of the first wall and the second wall into the flow passage a height R; wherein $0.01 \leq e/H \leq R/H < 0.5$.

9. The vortex restart structure according to claim 6, wherein the flow passage is thermally coupled to a fluid A in communication with the parting surface of the flow passage; the parting surface configured to thermally couple fluid A and a fluid B flowing in the flow passage for the transfer of thermal energy between the fluid A and the fluid B flowing in the flow passage responsive to a formation of counter rotating vortex pairs in the fluid B being restarted.

10. The vortex restart structure according to claim 6, wherein the multiple flow turbulators have a pitch P; wherein the at least one vortex restart structure configured spaced apart from about 1× to about 10× the flow turbulator pitch P.

11. The vortex restart structure according to claim 6, wherein a first vortex restart structure can extend from the first wall and align axially with a second vortex restart structure extending from the second wall.

12. The vortex restart structure according to claim 6, wherein the flow passage is formed in a gas turbine heat exchanger.

13. A process for managing a merged vortex with a vortex restart structure for a gas turbine engine heat exchanger comprising:
forming a flow passage having a first wall and a second wall opposite the first wall, each of the first wall and the second wall including a parting surface;
extending multiple flow turbulators from the parting surface of the first wall or the second wall; and
extending at least one vortex restart structure from the parting surface of the first wall or the second wall, wherein the at least one vortex restart structure extends from the parting surface into the flow passage beyond the multiple flow turbulators.

14. The process of claim 13, wherein the flow passage includes a height H; extending the at least one vortex restart structure from the first surface into the flow passage a height R; wherein $0.01 \leq e/H \leq R/H < 0.5$.

15. The process of claim 13, wherein the plurality of flow turbulators have a pitch P; and
spacing the at least one vortex restart structure apart a distance of from about 1× to about 10× the flow turbulator pitch P.

16. The process of claim 13, further comprising:
extending a first vortex restart structure from the first wall;
extending a second vortex restart structure from the second wall opposite the first vortex restart structure; and
aligning the first vortex restart structure axially with the second vortex restart structure.

17. The process of claim 13, further comprising:
forming the parting surfaces the flow passage including a cross-sectional asymmetry susceptible to a vortex breakdown.

18. The process of claim 13, further comprising:
creating a physical barrier with the at least one vortex restart structure within the flow passage; and
causing a merged vortex flowing in the flow passage to break up.

19. The process of claim 18, further comprising:
reforming a counter rotating vortex pair within a vortex restart structure zone downstream of the at least one vortex restart structure within the flow passage by use of a downstream turbulator configured to reassert influence on a flowing fluid within the flow passage.

* * * * *